United States Patent [19]

Schäfer et al.

[11] Patent Number: 5,474,959
[45] Date of Patent: Dec. 12, 1995

[54] PROCESS FOR THE PRODUCTION OF K- OR RB-β"- OR -β- ALUMINUM OXIDE ION CONDUCTORS

[75] Inventors: Günter Schäfer, Stuttgart; Arnold van Zyl, Ulm; Werner Weppner, Stuttgart, all of Germany

[73] Assignee: Max-Planck-Gesellschaft zur Forderung der Wissenschafter e.V., Gottingen, Germany

[21] Appl. No.: 219,191

[22] Filed: Mar. 28, 1994

Related U.S. Application Data

[63] Continuation of Ser. No. 906,820, Jun. 30, 1992, abandoned.

[30] Foreign Application Priority Data

Jul. 8, 1991 [DE] Germany .................. 41 22 586.4

[51] Int. Cl.$^6$ .................................................. C04B 35/113
[52] U.S. Cl. .......................... 501/153; 501/127; 264/299; 264/319; 423/625
[58] Field of Search ................................. 501/127, 153; 264/299, 319; 423/625

[56] References Cited

U.S. PATENT DOCUMENTS

| 3,707,589 | 12/1972 | Chiku et al. | 501/127 |
| 4,792,377 | 12/1988 | Dunn et al. | 501/153 |
| 4,937,214 | 6/1990 | Morita et al. | 501/127 |
| 4,946,664 | 8/1990 | Van Zyl et al. | 501/153 |

OTHER PUBLICATIONS

Crosbie et al., "Potassium Beta"–Alumina Membranes"; Jour. Amer. Cer. Soc., vol. 65, No. 4; Apr. 1982, pp. 187–191.

Park et al., "Na to K vapor–phase exchange in polycrystalline β"–alumina"; Solid State Ionics, 46; Feb. 1991, pp. 221–231.

Yang, "Thermal Stability of Multivalent Ion–Exchanged Beta" Aluminas", Doctorate Dissertation, UCLA; no month 1988, pp. 1–86.

Primary Examiner—Mark L. Bell
Assistant Examiner—C. Bonner

[57] ABSTRACT

The present invention provides a process for the production of a K- or Rb-β"- or -β-aluminum oxide powder preparation, wherein a cubic densely packed aluminum oxide (γ-aluminum oxide) or a precursor thereof is subjected to attrition together with a doping material or a precursor thereof, the so obtained mixture is calcined in an oxygen-containing atmosphere, potassium oxide or rubidium oxide or a precursor of these compounds is added to the calcination product obtained, the mixture is subjected to attrition and then calcined in an oxygen-containing atmosphere at a temperature greater than 900° C. The present invention also provides a process for the production of a ceramic formed body in which a powder obtained by the above process is converted by attrition, isostatic pressing and sintering into a ceramic formed body. Such a ceramic formed body can be used as an ion conductor.

13 Claims, 1 Drawing Sheet

PROCESS FOR THE PRODUCTION OF K- OR RB-β"- OR -β- ALUMINUM OXIDE ION CONDUCTORS

This is a continuation of application Ser. No. 07/906,820, filed on Jun. 30, 1992, now abandoned.

The present invention is concerned with a process for the production of K- and Rb-β"-aluminum oxide and of K- and Rb-β-aluminum oxide ceramic formed bodies which can be used as ion conductors.

In recent decades, great efforts have been made to develop improved energy storage systems with increased energy densities. It was thereby shown that the use of aqueous electrolytes, such as are conventional, for example, in lead batteries, exclude a large number of potential systems since they would react very vigorously with water. As a way out of this problem, there was employed the ion conduction observed in the case of some solid bodies and the ionic mobility improved. An already well-known system for this purpose thereby utilises the high sodium ion conduction in the so-called β-aluminate electrolytes (cf. J. Kummer, J. inorg. nucl. Chem., 29, 245/1967) in the sodium-sulphur cell.

Sodium β-aluminates are laminar structures of aluminum oxide spinel blocks between which sodium oxide layers are embedded in a regular arrangement. Of these aluminates, two structures exist which have a differingly good ionic conductivity. The higher ionically-conducting structure is called the β"-phase. It contains a higher proportion of alkali metal oxide than the β-phase and must be stabilised with a doping material. The elementary cell consists of three γ-aluminum oxide spinel blocks, between which are embedded the sodium oxide layers. The conductivity planes can here be designated as being defective structures of the aluminum oxide layers (cf. G. C. Farrington and B.Dunn, Solid State Ionics, 7, 267/1982; F. Harbach, J. Mat. Sci., 18, 2437/1983; R. Collongues et al., J. Phys. Chem. Solids, 45, 981/1984). The elementary cell of the β-phase consists of two γ-aluminum oxide spinel blocks. In the case thereof, a crystallographic mirror plane lies in the conductivity plane (cf. R. Collongues et al., loc. cit.). The β"-phase is, on the basis on its high sodium ion conductivity, used as electrolyte in two high capacity battery types (cf. R. Knoedler and R. Krapf, J. Power Source, 10, 263–270/1983; Zebra Cell, J. Coetzer et al., J. Electrochem. Soc., 134, 2379/1987).

Great interest is also directed towards the possibility of exchanging the sodium ions for other ions, for example lithium, potassium, rubidium, hydroxonium ($H_3O^+$), ammonium, calcium, strontium, barium, cadmium and lead ions. Solid body ion conductors with interesting properties can thereby be produced which can be considered for a large number of technical possibilities of use. The processes previously known for this purpose thereby start, to a large extent, from the well-known sodium compound (single crystal or ceramic; cf. P. S. Nicholson et al., Solid State Ionics, 18/19, 699/1986; B. Dunn and G. C. Farrington, Solid State Ionics, 18/19, 31/1986; A. Tan et al., Solid State Ionics, 42, 233/1990; and Van Zyl et al., U.S. Pat. No. 4,946,664) or from a mixed Na/K-β"/β-phase (cf. P. S. Nicholson et al., loc. cit.; P. S. Nicholson, Mat. Res. Soc. Symp. Proc., 135, 511/1979) since a direct synthesis of the K- or Rb-β"-phases is not possible according to the previously known methods (according to the zeta process (R. M. Dell and P. T. Moseley, J. Power Sources, 7, 45–63/1981/2) or from alcoholates; c.f. P. S. Nicholson et al., loc. cit.; P. S. Nicholson loc. cit ). There must, namely, first be produced a ceramic form of β"-aluminum oxide which possesses a sufficient strength in order to resist the stresses arising in the case of the ion exchange. Especially desirable would thereby be K-β"-aluminum oxide which is, however, metastable and, in the case of sintering, gives K-β-aluminum oxide (cf. P. S. Nicholson et al., loc. cit. ). In the most favourable case, the production according to the above-mentioned methods leads to mixed β/β"-phases or only to the β-phase. In order to obtain the potassium or rubidium compounds, hitherto there was, therefore, used as starting material the sodium compound produced according to the above-mentioned processes and, in a multi-step process, first exchanged for silver in a silver nitrate salt melt. This silver compound was then converted in potassium nitrate or rubidium nitrate salt melts into the potassium or rubidium compound.

Thus, with individual modifications, the previous methods started from sodium β"-aluminum oxide ceramics and replaced sodium ions by potassium ions by exchange in salt melts or in the gas phase. Although this exchange for salt melts has, in the meantime, been optimised (cf. P. S. Nicholson et al., loc. cit.; P. S. Nicholson, loc. cit.), this process nevertheless still possesses serious disadvantages. In the first place, the sodium β"-ceramic has to be produced, the ion exchange then takes place in salt melts or in the gas phase, a dissolving of the salt melts in water must take place in order to free the ceramic from salt residues and a drying of the ceramic at comparatively high temperatures is necessary.

Therefore, in all, these process steps lead to a very laborious and time-consuming carrying out of the process and, in addition, contain the danger that the ceramic gives way in its structure and displays crack formation, becomes mechanically soft and crumbles completely. This is due to the fact that the differing ionic radii of the cations to be exchanged in comparison with the sodium ion lead to a change of the elementary cell of the material, whereby, because of the stronger expansion forces, a strong stressing of the structure takes place and this leads to the fracture of the ceramics, i.e. after the exchange, the ceramics are only present as powder (cf. E. E. Hellstrom and R. E. Benner, Solid State Ionics, 11, 125/1983; D. Yang, Thesis, University of California, Los Angeles, U.S.A., 1988, Order No. 8828072; J. Kirchnerova and C. W. Bale, Mat. Res. Bull., 25, 395/1990).

The process is also very expensive and laborious because of the plurality of necessary process steps, the long exchange times and the necessary chemicals.

G. W. Schaefer et al., Solid State Ionics, 40/41, 154–157/ 1990, have described a direct synthesis of divalent β-aluminum oxide phases.

It is an object of the present invention to provide a process for the direct synthesis of K- and Rb-β"-aluminum oxide and of K- and Rb-β-aluminum oxide with which pure β"-phases can also be obtained, with which the disadvantages involved with the known processes of production can be avoided and with which ceramics with good ion conductivity and mechanical properties can be obtained in a simple and cost-favourable manner. This object is achieved with the present invention.

Thus, according to the present invention, there is provided a process for the production of a K- or Rb-β"- or -β-aluminum oxide powder preparation, wherein a cubic densely packed aluminum oxide (γ-aluminum oxide) or a precursor thereof is subjected to attrition together with a doping material or a precursor thereof, the so-obtained mixture is calcined in an oxygen-containing atmosphere, potassium oxide or rubidium oxide or a precursor of these compounds is added to the calcination product obtained, the mixture is subjected to attrition and then calcined at a temperature greater than 900° C. in an oxygen-containing atmosphere.

Depending upon the composition of the products and the calcination temperature of the mixture with potassium oxide or rubidium oxide, there can thereby be obtained the β"- or β-compound.

The composition of the compounds obtained according to the process of the present invention corresponds to the general formula:

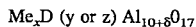

$Me_xD$ (y or z) $Al_{10+\delta}O_{17}$ wherein Me is potassium or rubidium, D is a doping material, preferably lithium, magnesium, zinc, cobalt, nickel, iron, manganese or copper, and x, y, z and δ are the stoichiometric factors, y thereby referring to monovalent and z to divalent doping materials, and δ defines the stoichiometric variations of the aluminum ions; $1.4 < x < 1.7$, $0.2 < y < 0.6$ and $0.4 < z < 1$.

As doping materials, according to the present invention there can be used all materials known and suitable for the stabilisation of β"- or β-aluminum oxide, there preferably being used lithium oxide, manganese oxide, magnesium oxide, zinc oxide, cobalt oxide, nickel oxide, ferrous oxide, cuprous oxide or mixtures thereof.

As precursors, there can be used compounds and mixtures thereof which, under the reaction conditions, form the doping materials; the doping materials are preferably used in the form of nitrates or hydroxides and especially of carbonates.

Potassium oxide or rubidium oxide are preferably used in the form of a precursor of these compounds or mixtures thereof. For this purpose, as precursors there are suitable those compounds which, under the reaction conditions, are converted into potassium oxide or rubidium oxide; as precursors, there are preferably used the nitrates or hydroxides and especially carbonates.

The cubically densely packed aluminum oxide is γ-aluminum oxide. As precursor for the γ-aluminum oxide structure, there is preferably used a crystalline modification of aluminum hydroxide ($Al(H_2O)_3$) which, in the case of heating, is converted into an ordered γ-aluminum oxide structure; such a precursor is especially crystalline boehmite or crystalline bayerite.

The calcination of the mixture of aluminum oxide and the doping materials preferably takes place at temperatures in the range of from 300° to 1000° C. and preferably of from 500° to 900° C. As a rule, the calcination period is from 0.5 to 30 hours and especially from 0.5 to 1 hour for monovalent doping materials and from 7 to 10 hours for divalent doping materials.

The further calcination of the mixture with potassium oxide and/or rubidium oxide for the production of the β"-phase takes place at a temperature greater than 900° C. and preferably at a temperature in the range of from 1250° to 1400° C. The calcination time is here preferably from 1 to 10 hours and especially from 1 to 2 hours.

The attrition process steps can be carried out in a manner usual for this purpose and in a conventional attritor, for example with corundum balls and isopropanol or another alcohol or demineralised water as solvent.

The amounts of the individual starting materials (aluminum oxide, doping materials, potassium oxide or rubidium oxide) or of the precursors thereof are so chosen that there is obtained the desired composition corresponding to the above-given formula

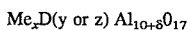

$Me_xD$(y or z) $Al_{10+\delta}O_{17}$

The powder preparation according to the present invention can then be converted in known manner by attrition, isostatic pressing and sintering into ceramic formed bodies suitable for use as ion conductors. Such ceramic formed bodies obtainable according to the present invention are very well suited, for example, for sensors or as starting materials for divalent or hydronium ion conductors.

Therefore, the present invention also provides a process for the production of K- or Rb-β"- or β-aluminum oxide ceramic formed bodies, wherein a powder preparation according to the present invention obtained in the above-described manner is converted by attrition, isostatic pressing and sintering into a ceramic formed body.

The isostatic pressing is preferably carried out in the pressure range of from 20 to 50 MPa and preferably of from 30 to 35 MPa. The sintering preferably takes place at a temperature in the range of from 1500° to 1700° C. and more preferably of from 1570° to 1650° C., it thereby being especially preferred to heat up to the sintering temperature at a rate of 100° to 300° C./hour.

In a preferred embodiment according to the present invention, the production of the powder preparations takes place in the following manner:

In a first step, there takes place the production of the doped γ-aluminum oxide or of a transitional modification of γ-aluminum oxide (δ, θ, ε-aluminum oxide). For this purpose, the salts of the doping material, preferably magnesium carbonate, water or magnesium nitrate, are mixed in a stoichiometric ratio with, for example, boehmite or bayerite as γ-aluminum oxide, introduced into an attritor and subjected to attrition, for example between corundum balls with isopropanol or demineralised water as solvent for a period of about 2 hours. The powder is then dried and sieved or freeze-dried. This powder mixture is then calcined, for example in the case of lithium oxide as doping material for 1.5 hours and in the case of magnesium oxide as doping material for 10 to 20 hours, in air and at a temperature of 750° C. or above. In the case of this carrying out of the reaction, there results a homogeneously doped γ-aluminum oxide phase as doped starting compound. In a second step, potassium oxide or rubidium oxide, preferably in the form of an appropriate alkali metal salt, is added in a stoichiometric amount or in excess with regard to the doped starting compound. As alkali metal salt, a carbonate or nitrate is especially preferred. The powder mixture is then subjected to attrition, for example with corundum balls and isopropanol as solvent. The powder is dried and sieved. For the production of the β"-phase, the powder is then calcined at a temperature above 1200° C., preferably for about 2 hours.

The production of the ceramic formed body from the K- or Rb-β"- or β-aluminum oxide powder preparation takes place, in a preferred embodiment according to the present invention, in the following way:

The K- or Rb-β"- or β-aluminum oxide powder is subjected to attrition, for example in isopropanol as solvent, then dried and sieved. This dried powder is pressed isostatically, preferably at a pressure of 30 to 35 MPa, to give small pellets. Green bodies are thereby obtained with 65 to 75% of the theoretical density of the material. The green bodies are then dried, for example at 200° C., over the course of one hour and sintered. For the sintering, they are preferably heated to 1570° to 1650° C. at a rate of 100 to 300° C./hour. The sintering time is preferably from 5 to 40 minutes. Thereafter, cooling is carried out, preferably at a rate of 900° C./hour, to a temperature of 1400° C. and then further cooled to ambient temperature at a rate of 300° C./hour. The ceramics obtained are hard and have a density of more than 95% of the theoretical density.

The following Examples are given for the purpose of illustrating the present invention:

EXAMPLE 1

Production of lithium-stabilised K-β"-aluminum oxide ceramic

| The following weighed in amounts | |
|---|---|
| lithium oxide | 2.58 mol % |
| aluminum oxide | 83.36 mol % |
| potassium oxide | 14.06 mol % | give $K_{1.67}Li_{0.33}Al_{10.67}O_{17}$

The precursors used for lithium oxide and potassium oxide are lithium carbonate and potassium carbonate. A 100 g batch of lithium carbonate and boehmite is weighed out and mixed in an attrition mill with the use of 200 g of corundum balls. After the addition of 150 ml isopropanol, grinding is carried for 2 hours at 750 r.p.m. Thereafter, the resultant suspension is dried at 80° C. and the dried powder sieved in a sieve with a mesh size of 0.18 mm. This powder mixture is heated at a rate of 200° C./hour to 500° C. After maintenance of this temperature for 2 hours, it is heated at a rate of 200° C./hour to 750° C. and calcined for 1 hour. The powder obtained is mixed with potassium carbonate and subjected to attrition for 2 hours at 750 r.p.m. with the use of 300 g of corundum balls with 200 ml isopropanol. Subsequently, drying is carried out at 80° C., followed by sieving as described above. The powder is heated in air at a rate of 200° C./hour to 1350° C. and calcined for 2 hours.

The K-β"-powder thus obtained is subjected to attrition, dried and sieved. It is now isostatically pressed at 30 to 35 MPa pressure to give pellets. The green bodies obtained have a density of 65 to 75% of the theoretical density. For sintering, the pellets are heated at a rate of 200° C./hour to 1400° C. and then further heated at a rate of 900° C./hour to 1600° C. This temperature is maintained for 5 minutes. Thereafter, cooling is carried out at a rate of 900° C./hour to 1400° C. and from there further cooled at a rate of 300° C./hour to ambient temperature.

EXAMPLE 2

Production of lithium-stabilised Rb-β"-aluminum oxide ceramic

| Weighed in amounts | |
|---|---|
| lithium oxide | 2.58 mol % |
| aluminum oxide | 83.36 mol % |
| rubidium oxide | 14.06 mol % |

The precursors used for lithium oxide and rubidium oxide are lithium carbonate and rubidium carbonate. The procedure used for the production of the ceramic corresponds to the process described in Example 1.

EXAMPLE 3

Production of magnesium-stabilised K-β"-aluminum oxide and Rb-β"-aluminum oxide ceramics

| The following weighed in amounts: | |
|---|---|
| magnesium oxide | 6.25 mol % |
| aluminum oxide | 79.69 mol % |
| potassium oxide or rubidium oxide | 14.06 mol % | gives $Me_{1.8}Mg_{0.8}Al_{10.2}O_{17}$ (Me = K or Rb).

Magnesium carbonate monohydrate as precursor for magnesium oxide and boehmite are weighed out in the correct stoichiometric ratio and subjected to attrition as described in Example 1. The dried precursor obtained is heated at a rate of 200° C./hour to 500° C., the temperature is maintained for 1 hour, then further heated at a rate of 200° C./hour to 750° C. and calcined at this temperature for 10 hours. The doped γ-aluminum oxide so obtained is then mixed with potassium carbonate as potassium oxide precursor and, as described in Example 1, is subjected to attrition, calcined and sintered. The production of the rubidium ceramic takes place analogously to that of the potassium ceramic.

EXAMPLE 4

Production of lithium-stabilised K-β"-aluminum oxide and Rb-β"-aluminum oxide ceramics Lithium carbonate and potassium carbonate as precursors for lithium oxide and potassium oxide are mixed with boehmite in stoichiometric ratio and subjected to attrition as described in Example 1. For the calcination, the sample is heated at a rate of 200° C./hour to 500° C. and maintained at this temperature for 1 hour. The material is now heated at a rate of 200° C./hour to 750° C., maintained at this temperature for 1.5 hours and then heated at the same rate of heating up to 1350° C. for 2 hours in order to calcine the sample. Thereafter, the powder is subjected to further attrition and isostatically pressed to give pellets which are sintered according to the procedure described in Example 1. The ceramic obtained according to this procedure corresponds in its properties approximately to that obtained according to Example 1. However, the grain fraction of the powder here obtained is coarser than in Example 1.

With the process according to the present invention for the production of K- or Rb-Γ"- or -β-aluminum oxide powder preparations and the ceramic bodies formed therefrom, a process is provided with which can be avoided the disadvantages involved in connection with the processes hitherto conventional therefor.

BRIEF DESCRIPTION OF THE DRAWING

The accompanying Figures show schematically the process according to the present invention (FIG. 2) in comparison with the previously usual procedure (FIG. 1). As a comparison with the previously usual process shows, the following advantages are, in particular, achieved with the process according to the present invention.

1. a simple ceramic carrying out of the process;
2. an indirect path via an Na-β"-ceramic as starting material is no longer necessary;
3. a cation exchange is not necessary, for which reason
4. no change of the elementary cell takes place as in the case of the potassium exchange and, therefore, there is no danger of structural fatigue, crack formation or disintegration;
5. it is possible to start from a chemically defined material and no indirect route via mixed β/β"-phases is necessary (cf. P. S. Nicholson et al., loc. cit.; P. S. Nicholson, loc. cit.);
6. a phase-pure β"-material can be produced without residues of β-phase;
7. Rb-β"-ceramic can only be produced by the process according to the present invention;
8. a simple production of ceramics with an aimed-for composition is possible and thus also the production of the pure γ-phase;
9. high-resolution HREM investigations show that the stack sequence of the spinel layers, in comparison with material produced according to previously usual processes or directly from γ-aluminum oxide powder without aluminum oxide stage, is very uniform (regular 4th origin of the oxygen layers, individual 6th oxygen layers).

Figure 2:
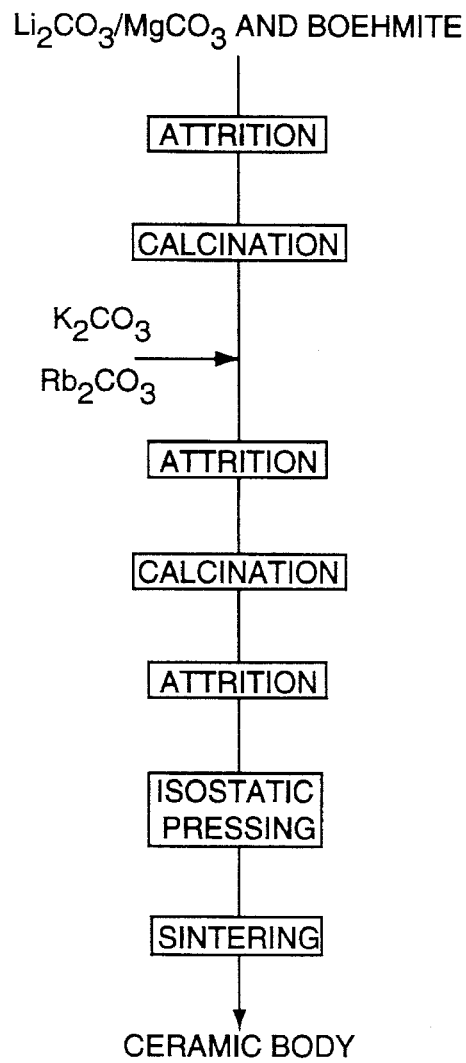
Figure 1:
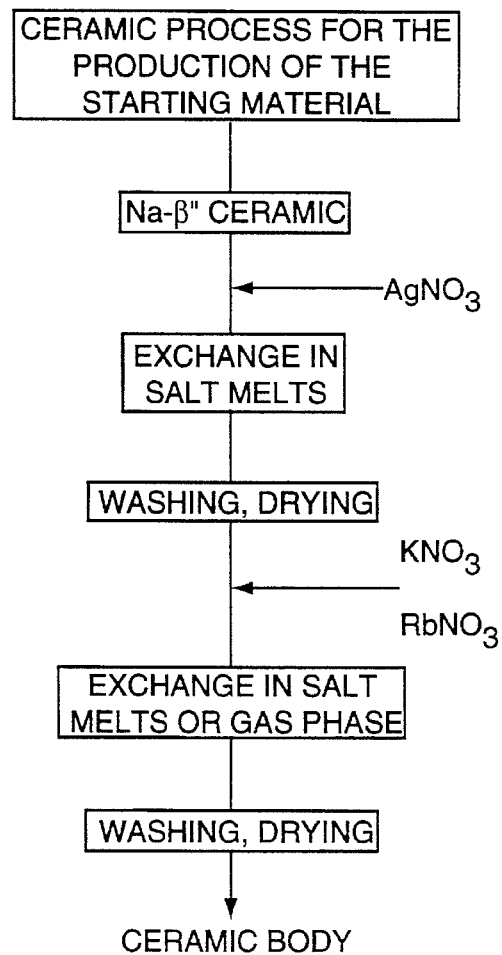

We claim:

1. Process for the production of a K- or Rb-β"-aluminum oxide ceramic formed body having the general formula:

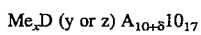
$$Me_xD \text{ (y or z) } A_{10+\delta}O_{17}$$

wherein Me is potassium or rubidium, D is a doping material capable of stabilizing the β" aluminum oxide and x, y, z and δ are the stoichiometric factors, y thereby referring to monovalent and z to divalent doping material, and δ defines the stoichiometric variations of the aluminum ions; 1.4<x<1.7, 0.2<y<0.6 and 0.4<z<1, wherein a cubic densely packed aluminum oxide (γ-aluminum oxide) or a precursor thereof is subjected to attrition together with the doping material or precursor thereof, the so obtained mixture is calcined in an oxygen-containing atmosphere, potassium oxide or rubidium oxide or precursor of these compounds is added to the calcination product obtained, the mixture is subjected to attrition and the calcined in an oxygen-containing atmosphere at a temperature greater than 900° C. to obtain a powder preparation, the powder is subjected to attrition, isostatic pressing and sintering to form a ceramic formed body having a density of more than 95% of the theoretical density.

2. Process according to claim 1, wherein lithium oxide, magnesium oxide, zinc oxide, cobalt oxide, nickel oxide, ferrous oxide, manganese oxide or cuprous oxide or a mixture thereof is used as doping materials.

3. Process according to claim 1, wherein the doping materials are used in the form of nitrates or hydroxides or carbonates as precursors.

4. Process according to claim 1, wherein the potassium oxide or rubidium oxide is used in the form of a precursor of these compounds or of a mixture thereof.

5. Process according to claim 4, wherein, as precursors, there are used the nitrates or hydroxides or the carbonates.

6. Process according to claim 1, wherein, as precursor for the aluminum oxide structure, there is used a crystalline modification of aluminum hydroxide $(Al(H_2O)_3)$ which, upon heating, is converted into an ordered aluminum oxide structure.

7. Process according to claim 6, wherein crystalline boehmite or crystalline bayerite is used as aluminum hydroxide.

8. Process according to claim 1, wherein the calcination of the attrited mixture of aluminum oxide and doping materials takes place at a temperature in the range of from 300° to 1300° C.

9. Process according to claim 1, wherein, for the production of the β"-aluminum oxide phase, the calcination of the attrited mixture with potassium oxide or rubidium oxide is carried out at a temperature greater than 1200° C.

10. Process according to claim 1, wherein the isostatic pressing is carried out at a pressure of from 30 to 35 MPa.

11. Process according to claim 1, wherein the sintering is carried out at a temperature in the range of from 1570° to 1650° C.

12. Process according to claim 11, wherein heating up to the sintering temperature is carried out at a rate of 100° to 300° C./hour.

13. K- and Rb-β"- oxide ceramic formed bodies, produced by the process of claim 1.

\* \* \* \* \*